UNITED STATES PATENT OFFICE.

HENRY GOLDMANN, OF NEW YORK, N. Y.

IMPROVEMENT IN TREATING COTTON-SEED OIL FOR PAINT.

Specification forming part of Letters Patent No. 153,251, dated July 21, 1874; application filed April 4, 1874.

*To all whom it may concern:*

Be it known that I, HENRY GOLDMANN, of the city, county, and State of New York, have invented a new and useful Improvement in Processes for Converting Cotton-Seed Oil into a Drying-Oil for Paints, &c., of which the following is a specification:

My invention has for its object to prepare cotton-seed oil by a chemical treatment, so that it may be useful in the arts as a substitute for linseed-oil; and it consists in the process by which this is accomplished.

In carrying my improved process into practical effect, I add gradually, and under strong and constant agitation, seven pounds of aqua regia freshly prepared and diluted with ten gallons of water to one hundred gallons of clear cotton-seed oil, and continue the agitation for two hours. The mixture is then heated to about three hundred degrees (300°) Fahrenheit for two hours. After standing twenty-four hours the oil is drawn off into another vessel, where it is mixed with seven pounds of bisulphuret of carbon, and is heated to about three hundred degrees (300°) Fahrenheit under agitation for one hour. While still hot, I put into it gradually fifteen pounds of artificial sulphate of baryta, agitating and heating it to about three hundred degrees (300°) Fahrenheit for two hours; the oil is then allowed to stand until it is clear enough for use.

Having thus described my invention, I claim as new and desire to secure by Letters Patent—

The process of converting cotton-seed oil into a drying-oil by adding aqua regia, bisulphuret of carbon, and sulphate of baryta, and also heating and agitating the liquid compound in the order or succession specified.

HENRY GOLDMANN.

Witnesses:
JAMES T. GRAHAM,
T. B. MOSHER.